United States Patent
Zhao et al.

(10) Patent No.: US 11,613,930 B2
(45) Date of Patent: Mar. 28, 2023

(54) SYSTEMS AND METHODS TO IMPROVE DIRECTIONAL DRILLING

(71) Applicant: Halliburton Energy Services, Inc., Houston, TX (US)

(72) Inventors: Yiming Zhao, Katy, TX (US); Umut Zalluhoglu, Humble, TX (US); Julien Marck, Houston, TX (US); Robert Darbe, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 239 days.

(21) Appl. No.: 16/640,329

(22) PCT Filed: Dec. 28, 2017

(86) PCT No.: PCT/US2017/068767
§ 371 (c)(1),
(2) Date: Feb. 19, 2020

(87) PCT Pub. No.: WO2019/132929
PCT Pub. Date: Jul. 4, 2019

(65) Prior Publication Data
US 2021/0071477 A1  Mar. 11, 2021

(51) Int. Cl.
*E21B 7/04* (2006.01)
*E21B 7/06* (2006.01)
(Continued)

(52) U.S. Cl.
CPC .............. *E21B 7/06* (2013.01); *E21B 44/02* (2013.01); *E21B 49/00* (2013.01); *G06Q 10/06313* (2013.01); *E21B 2200/20* (2020.05)

(58) Field of Classification Search
CPC ........ E21B 41/00; E21B 41/0092; E21B 7/04; E21B 2200/22
See application file for complete search history.

(56) References Cited

U.S. PATENT DOCUMENTS 7,172,037 B2    2/2007  Dashevskiy et al.
7,546,884 B2 *  6/2009  Veeningen ............... E21B 7/04
                                                       702/9
(Continued)

FOREIGN PATENT DOCUMENTS

WO    2016032640 A1    3/2016

OTHER PUBLICATIONS

International Search Report and Written Opinion dated Sep. 10, 2018, International PCT Application No. PCT/US2017/068767.

*Primary Examiner* — Kenneth L Thompson
(74) *Attorney, Agent, or Firm* — Barnes & Thornburg, LLP (57) ABSTRACT

The disclosed embodiments include systems and methods to improve downhole drilling. In one embodiment, a method to improve downhole drilling includes receiving a well plan, where the well plan is indicative of a well path to form a borehole of a hydrocarbon well is provided. The method also includes receiving measurements indicative of a previously-drilled section of the borehole. The method further includes generating, based on the measurements, a trajectory of the borehole, where the trajectory is a function of a depth. The method further includes providing the trajectory of the borehole to a Model Predictive Controller. The method further includes steering a tool towards the well path based on an output of the Model Predictive Controller.

20 Claims, 5 Drawing Sheets

(51) Int. Cl.
*E21B 44/02* (2006.01)
*E21B 49/00* (2006.01)
*G06Q 10/0631* (2023.01)

(56) References Cited

U.S. PATENT DOCUMENTS

| | | | | |
|---|---|---|---|---|
| 8,055,358 B2* | 11/2011 | Blevins | ............... | G05B 13/022 |
| | | | | 700/28 |
| 8,417,495 B2* | 4/2013 | Dashevskiy | ......... | G01V 11/002 |
| | | | | 706/14 |
| 8,996,396 B2* | 3/2015 | Benson | ................. | E21B 7/04 |
| | | | | 705/400 |
| 9,945,222 B2* | 4/2018 | Sugiura | ................ | E21B 44/005 |
| 10,001,004 B2* | 6/2018 | Bayliss | ................ | E21B 44/005 |
| 10,214,964 B2* | 2/2019 | Hornblower | ............. | E21B 7/06 |
| 10,519,718 B2* | 12/2019 | Banirazi-Motlagh | ....................... | |
| | | | | E21B 47/022 |
| 10,746,009 B2* | 8/2020 | Hoehn | ................. | E21B 47/12 |
| 10,760,380 B2* | 9/2020 | Bolchover | .............. | E21B 43/30 |
| 10,907,468 B2* | 2/2021 | Samuel | ................. | E21B 44/00 |
| 11,085,283 B2* | 8/2021 | Benson | ................. | E21B 44/00 |
| 11,151,762 B2* | 10/2021 | Flanagan | ............... | E21B 44/00 |
| 11,319,793 B2* | 5/2022 | Madasu | ................ | G06Q 50/02 |
| 11,473,407 B2* | 10/2022 | Tang | ..................... | E21B 41/00 |
| 2010/0175922 A1 | 7/2010 | Ignova et al. | | |
| 2013/0341092 A1 | 12/2013 | Hay et al. | | |
| 2015/0218887 A1* | 8/2015 | Bayliss | ................ | E21B 44/005 |
| | | | | 175/24 |
| 2015/0330209 A1* | 11/2015 | Panchal | ............... | G05B 13/042 |
| | | | | 700/275 |
| 2016/0003008 A1* | 1/2016 | Uribe | .................... | E21B 49/00 |
| | | | | 166/250.01 |
| 2016/0186551 A1 | 6/2016 | Dykstra | | |
| 2017/0350229 A1* | 12/2017 | Hoehn | ................. | E21B 47/024 |
| 2018/0171774 A1* | 6/2018 | Ringer | ................. | E21B 47/024 |

* cited by examiner

SYSTEMS AND METHODS TO IMPROVE DIRECTIONAL DRILLING

BACKGROUND

The present disclosure relates generally to systems and methods to improve downhole drilling.

Modern drilling operations are sometimes performed in accordance to a well plan, which includes the specifications of a well path to reach hydrocarbon resources stored in the subterranean and subsea formations.

However, a drilled borehole may sometimes deviate from the well path of the well plan. In directional drilling operations, the deviation may include deviation in the inclination and azimuth of the borehole. Such deviation may not only reduce the output and efficiency of subsequent hydrocarbon production operations, but may also increase drilling and production risks.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical algorithmic changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to methods and systems to improve downhole drilling. More particularly, the present disclosure relates to steering systems and methods to improve directional drilling operations. A well plan representing a desired well path to form a borehole of a hydrocarbon well is provided to a steering system (or a processor of the steering system). As defined herein, a steering system includes any system having hardware and software components operable to perform operations described herein to obtain a well plan, the well plan being indicative of a well path to form the borehole, receive measurements indicative of a previously-drilled section of the borehole, and generate, based on the measurements, a trajectory of the borehole. In some embodiments, the steering system also includes a drilling tool, such as the drilling tool illustrated in FIG. 1 and described in the paragraphs below. In other embodiments, the steering system is an onboard component of the drilling tool. In further embodiments, the steering system is deployed at a location remote from the location of the drilling tool. The steering system includes or is communicatively connected to a Model Predictive Control (MPC) controller operable to perform one or more MPC schemes to predict the unmeasured borehole (trajectory of the borehole) and produce control inputs. In some embodiments, control inputs are steering instructions to steer a drill bit of the drilling tool towards the well path. In one of such embodiments, the drilling tool, upon receipt of such instructions, automatically steers the drill bit in accordance with the instructions. In another one of such embodiments, the instructions are advisory instructions that the drilling tool may consider when determining how to steer the drill bit.

The steering system also has access to measurements that are indicative of a previously-drilled section of the borehole (such as a section of the borehole which has recently been drilled by a drill bit of the drilling tool but has not yet been measured by a sensor component of the drilling tool due to a time delay or due to the location of the sensor). Examples of such measurements include, but are not limited to, dimensions of the borehole (or section of the borehole), a depth of the section of the borehole, an inclination of the section of the borehole, an azimuth of the borehole, a tortuosity of the borehole, a rate of change in the curvature of the borehole, as well as other quantifiable metrics of the previously-drilled section of the borehole. In some embodiments, the steering system also has access to measurements indicative of the drilling tool, the surrounding formation, and interactions between the drilling tool and the formation. Examples of such measurements include, but are not limited to, a weight on the drill bit, a side cutting efficiency of the drill bit, a geometry of the drilling tool (or the drill bit), material properties of the drilling tool (or the drill bit), material properties of a formation surrounding the borehole, as well as other quantifiable measurements that are indicative of the drilling tool, the surrounding formation, and the interactions between the drilling tool and the formation.

The drilling system generates, based on the measurements, a depth domain model of a projected trajectory of the borehole. As defined herein, a depth domain model is a model that is expressed as a function of depth, such as the depth of the drilling tool, the depth of the drill bit, the depth of the bottom hole assembly, or the depth of another component used to form the borehole. In some embodiments, the depth domain model projects the position of the borehole, the azimuth of the borehole, the inclination of the borehole, the tortuosity of the borehole, the rate of change in the curvature of the borehole, as well as other quantifiable metrics of the projected trajectory of the borehole.

In one embodiment, the drilling system determines if the trajectory of the borehole deviates from the well path set forth by the well plan. In some embodiments, the MPC controller component of the drilling system utilizes the depth domain model to predict the unmeasured borehole and produce control inputs to steer the drill bit of the drilling tool towards the well path. In some embodiments, the steering system determines if the trajectory of the borehole deviates from the well path by more than a predetermined threshold increment (such as, but not limited to, being different by more than a threshold azimuth, being different by more than a threshold inclination, being different by more than a threshold position). In such embodiments, the steering system, in response to a determination that the trajectory of the borehole deviates from the well path by more than the predetermined threshold increment, steers (or recommends) the drilling tool to steer the drill bit of the tool towards the well path in terms of at least one of position and attitude. In some embodiments, the steering system, in response to determining that the trajectory of the borehole deviates from the well path by more than the threshold increment, steers the drilling tool to steer towards the well path based on the output of the MPC Controller. Given that the depth domain model is a function of depth, properties such as the geometry of the drilling tool, material properties of the drilling tool (as well as the drill bit, the bottom hole assembly, or another tool or component used in the drilling operations), material properties of the surrounding formation, as well as other properties described herein may be utilized as model variables. In some embodiments, the drilling system uses a bottom hole assembly model, a bit/rock-interaction model, and a kinematic model, which may be calibrated based on the measurements indicative of the previously-drilled section of the borehole, as well as measurements indicative of the drilling tool, the surrounding formation, and interactions between the drilling tool and the formation. In such embodiments, the steering system determines at least one interaction between the bottom hole assembly model, the bit/rock interaction model, and the kinematic model, and generates outputs of the depth domain model based on the at least one interaction between the bottom hole assembly model, the bit/rock interaction model, and the kinematic model. In such embodiments, values indicative of interactions between the foregoing models are input parameters of the depth domain model that fine tune the depth domain model. Moreover, the steering system inputs the values into the depth domain model to obtain outputs indicative of the trajectory of the borehole. In some embodiments, the steering system utilizes some of the outputs of the depth domain model to determine steering instructions to steer the drill bit towards the well path and provides the steering instructions to the drilling tool.

In some embodiments, the depth domain model contains at least one delayed equation. In one or such embodiments, the delayed equation is an algebraic equation. In another one of such embodiments, the delayed equation is a differential equation. Examples of equations used to generate the depth domain model are provided in the paragraphs below.

In some embodiments, the drilling system periodically uses/generates a second and more accurate depth domain model that considers additional metrics such as over gauge, under gauge, torque, drag, rock formation, bit wear, and bit walk. In some embodiments, the steering system generates both the depth domain model described in the previous paragraph (first depth domain model) and the second, more accurate depth domain model (second depth domain model) to obtain two models of the projected trajectory of the borehole. In one of such embodiments, the second depth domain model is utilized by the steering system to forecast the borehole that has been created but has not been measured and to steer the steering system towards the well path, whereas the first depth domain model is utilized by the steering system to predict a trajectory of an undrilled section of the borehole and to determine optimal controls and configurations of the steering system.

In some embodiments, the steering system calculates a cost function of the depth domain model to determine how to steer the bit towards the well path. More particularly, the MPC controller component of the steering system calculates the cost function within a MPC scheme while predicting the unmeasured borehole and producing control inputs. The cost function has at least one variable component that affects how the drilling tool may steer the drill bit. In some embodiments, the cost function has a component that is a deviation (such as, but not limited to, the deviation in the position, the attitude, and/or the curvature) between the trajectory of the borehole and the drill path. In such embodiments, the steering system (or the MPC controller component of the steering system) determines a steering action that minimizes the cost function and then performs the steering action that is obtained by minimizing the cost function. In other embodiments, the steering system determines a steering action that maximizes the cost function and then performs the steering action that is obtained from maximizing the cost function. Other examples of components of the cost function include a threshold deviation trajectory of the borehole and the drill path, the tortuosity of the trajectory of the borehole, the threshold smoothness of the trajectory of the borehole, the rate of penetration, the rate of change in curvature of the trajectory of the borehole, the material property of the bottom hole assembly (or components of the bottom hole assembly), the sensitivity of the sensor, the material property of the surrounding formation, as well as other factors discussed herein. In such embodiments, the number of applicable components, as well as the values of such components, is job dependent. The steering system determines a steering action (such as adjusting the inclination of the drill bit, adjusting the azimuth of the drill bit, as well as making other adjustments to the drill bit) that satisfies all of the applicable constraints of the cost function, and performs the determined steering action to steer the drill bit towards the well path. In some embodiments, the steering system recommends the drilling tool to perform the steering action from a minimization of the cost function. For example, in some embodiments, the cost function has a component that corresponds to a deviation between the trajectory of the borehole and drill path. In such embodiments, the steering system determines a steering action that minimizes the cost function. Additional descriptions of the foregoing systems, drilling tools, and methods to improve drilling are described in the paragraphs below and are illustrated in FIGS. 1-4.

Figure 1A:
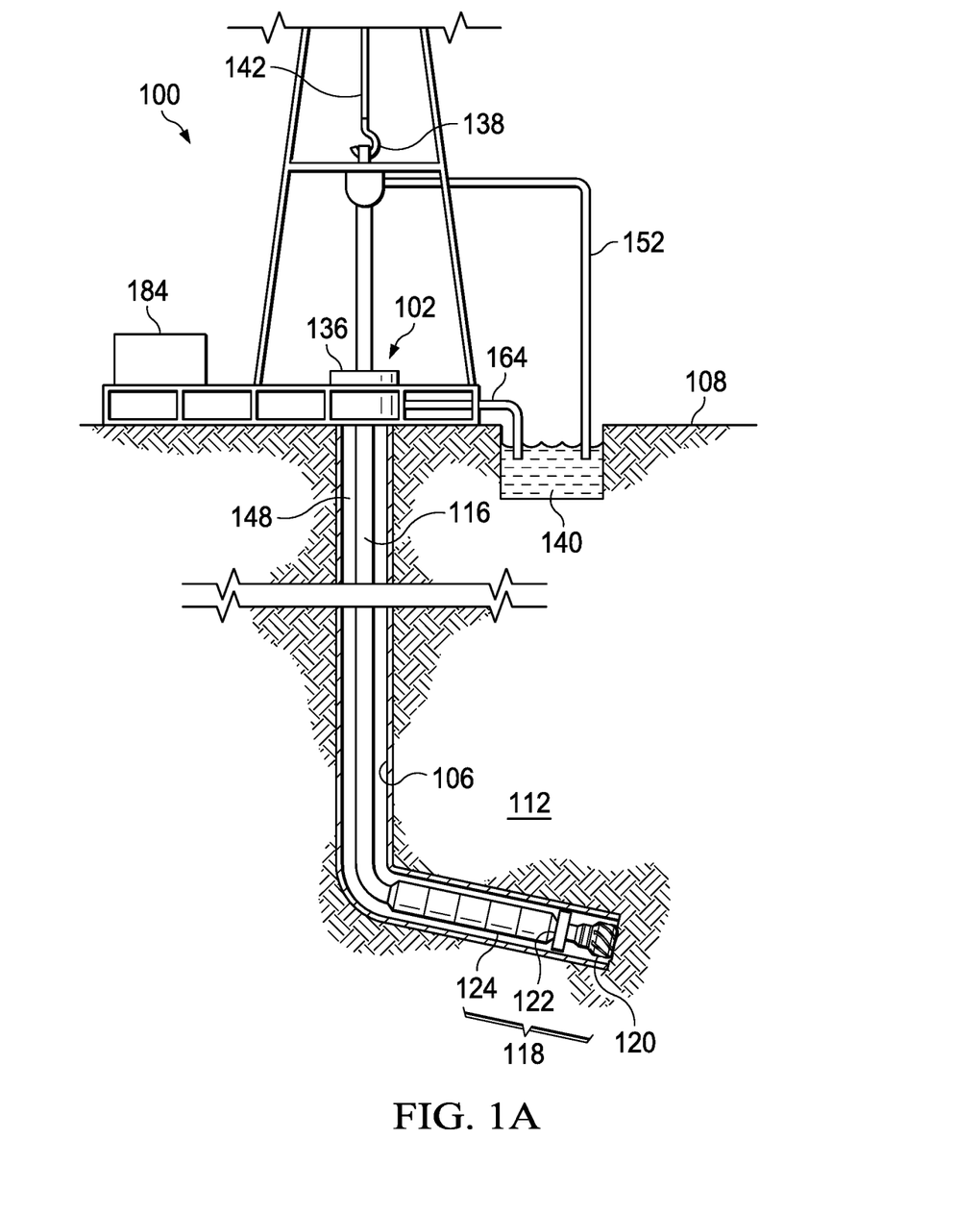
FIG. 1A is a schematic, side view of a wellsite having a borehole that extends into a subterranean formation.
Figure 1B:
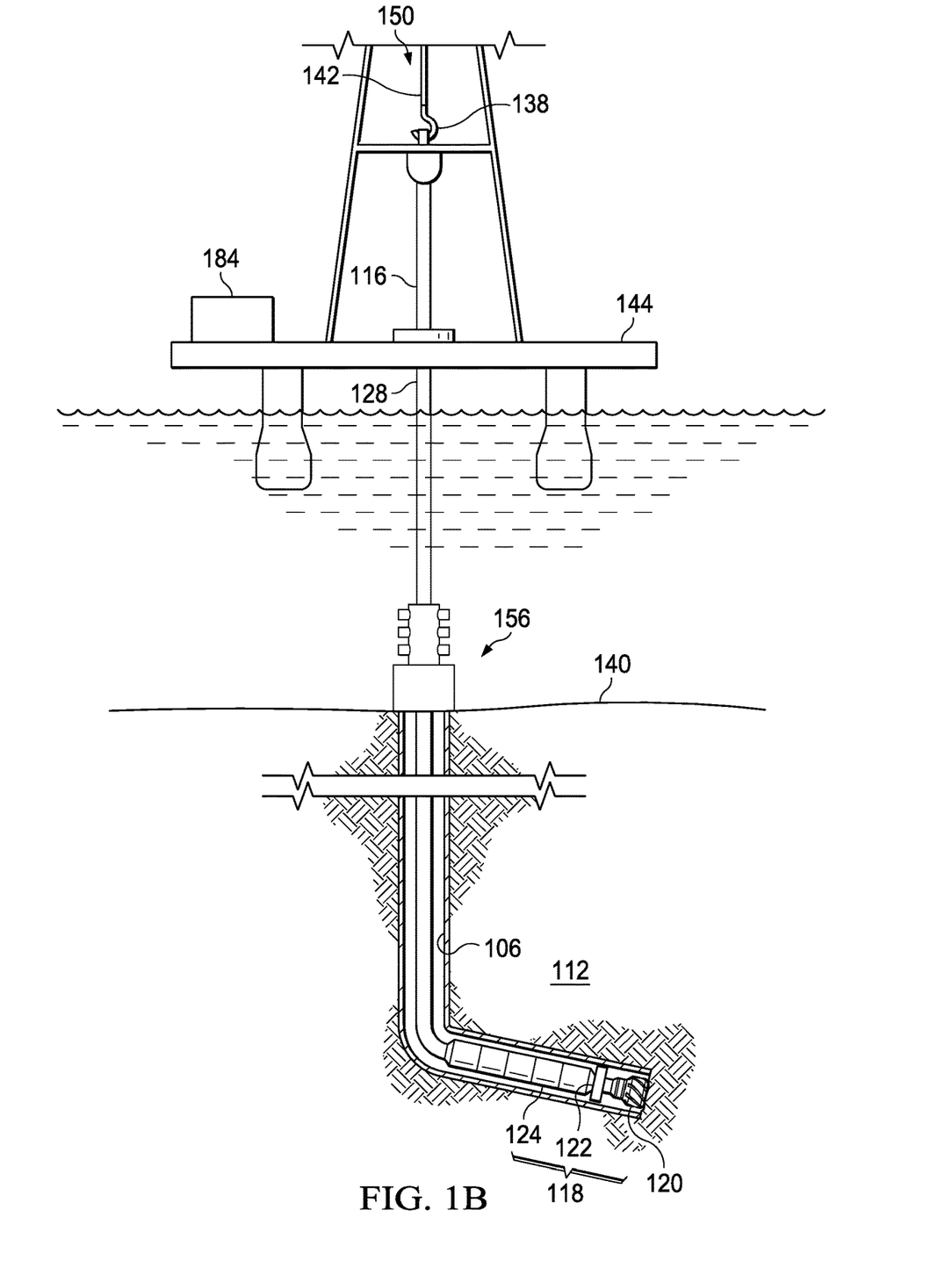
FIG. 1B is a schematic, side view of another wellsite having a borehole that extends into a subsea formation.

Turning now to the figures, FIG. 1A is a schematic, side view of a drilling environment 100, where a steering system 118 having a drill bit 120, a sensor 122, and a drilling tool 124 is deployed in an on-shore well 102 to perform drilling operations described herein to form a borehole 106 that extends from surface 108 to or through a formation 112. As defined herein, the drilling tool 124 is any tool operable to perform (or control one or more drill bits to perform) directional, horizontal, vertical, or other types of drilling operations to form a borehole, such as the borehole 106 in accordance with the specification of a well plan. In some embodiments, the drill bit 120 is a component of the drilling tool 124. In some embodiments, the drilling tool 124 is a component of a bottom-hole assembly. In other embodiments, the drilling tool 124 represents the bottom-hole assembly. FIG. 1B illustrates a schematic, side view of another drilling environment 150, where the steering system 118 of FIG. 1 is deployed from an offshore platform 144 into an underwater well. As defined herein, the "offshore platform" 124 may be a floating platform, a platform anchored to a seabed 140 or a vessel.

In the embodiment of FIG. 1A, a hook 138, cable 142, traveling block (not shown), and hoist (not shown) are provided to lower a conveyance 116 from the surface 108, down borehole 106, or to lift the conveyance 116 up from the borehole 106. Similarly, in FIG. 1B, the conveyance 116 is lowered below the seabed 140, through a blowout preventer 156 of the underwater well, and down into the borehole 106. In some embodiments, the conveyance 116 may be drill pipe, wireline, slickline, coiled tubing, production tubing, downhole tractor or another type of conveyance operable to deploy the steering system 118. At wellhead 136, an inlet conduit 152 is coupled to a fluid source (not shown) to provide fluids, such as drilling fluids, downhole. The fluids travel down the conveyance 116, and exit the conveyance 116 at drill bit 120. The fluids flow back towards the surface 108 through a wellbore annulus 148 and exit the wellbore annulus 148 via an outlet conduit 164 where the fluids are captured in a container 140.

The sensor 122 is deployed proximate the drill bit 120 to monitor the drilling operation. The sensor 122 is any instrument operable to measure, estimate, or infer the true vertical depth of the drill bit (or another component of the drilling tool or the borehole), the position of the drill bit 120, the azimuth of the drill bit 120, the inclination of the drill bit 120, the tortuosity of the trajectory of a recently-formed section of the borehole 106, the threshold smoothness of the trajectory of the borehole 106, the rate of change in a curvature of the trajectory of the borehole 106, as well as other measurements of the drill bit 120 (such as, but not limited to, the weight on bit, torque on bit, rotations per minute, and acceleration), another component deployed proximate the sensor 122, or the recently-formed section of the borehole 106. In some embodiments, the sensor 122 is also operable to determine one or more properties of fluids flowing past the sensor 122, an area of the borehole 106 proximate to the sensor 122, and an area of the surrounding formation 112 proximate the sensor 122. Examples of such properties include, but are not limited to, material properties, temperature, pressure, salinity, pH, viscosity, vibration, noise level, as well as other measurable properties of the fluids, the borehole 106 and the surrounding formation 112. Although FIGS. 1A and 1B depict a single sensor 122, the steering system 118 may include multiple sensors.

The drilling tool 124 periodically obtains measurements made by the sensor 122 to determine whether a recently-drilled section of the borehole 106 matches with a well path specified by a well plan. In that regard, the drilling tool 124 generates a model trajectory of the borehole 106 expressed as a function of the depth of the drill bit 120 (the depth of another drilling to component or the depth of the recently created section of the borehole 106). In some embodiments, the drilling tool 124 determines if the trajectory of the borehole 106 deviates from the well path specified by the well plan. If the tool determines that the trajectory of the borehole 106 deviates from the well path, then the drilling tool 124 steers the drill bit 120 towards the well path specified by the well plan. In some embodiments, the drilling tool 124 performs a cost function of the generated model of the trajectory of the borehole 106 to determine how to steer the drilling tool 124. In such embodiments, the cost function contains at least one variable component used to determine how to steer the drill bit 120 towards the well path. In some embodiments, the steering system 118 also predicts an undrilled section of the borehole 106 based on the measurements and steering recommendations generated by the steering system 118.

In some embodiments, the foregoing operations are performed by a control 184, which includes one or more electronic systems. In such embodiments, the control 184 is also a component of the steering system 118 and is communicatively connected to the downhole components of the steering system 118 through telemetry. Moreover, the control 184 is operable to assess the well plan and receive (through telemetry) measurements obtained by the sensor 122 as well as other measurements described herein. In such embodiments, the control 184 is further operable to generate models of the trajectory of the borehole 106, determine if the trajectory of the borehole 106 deviates from the well path, and to request the drill bit 120 to steer towards the well path as specified by the well plan. Although FIGS. 1A and 1B illustrate the control 184 as being a surface based component, in other embodiments, the control 184 is deployed downhole, proximate to the drilling tool 124.

Figure 2:
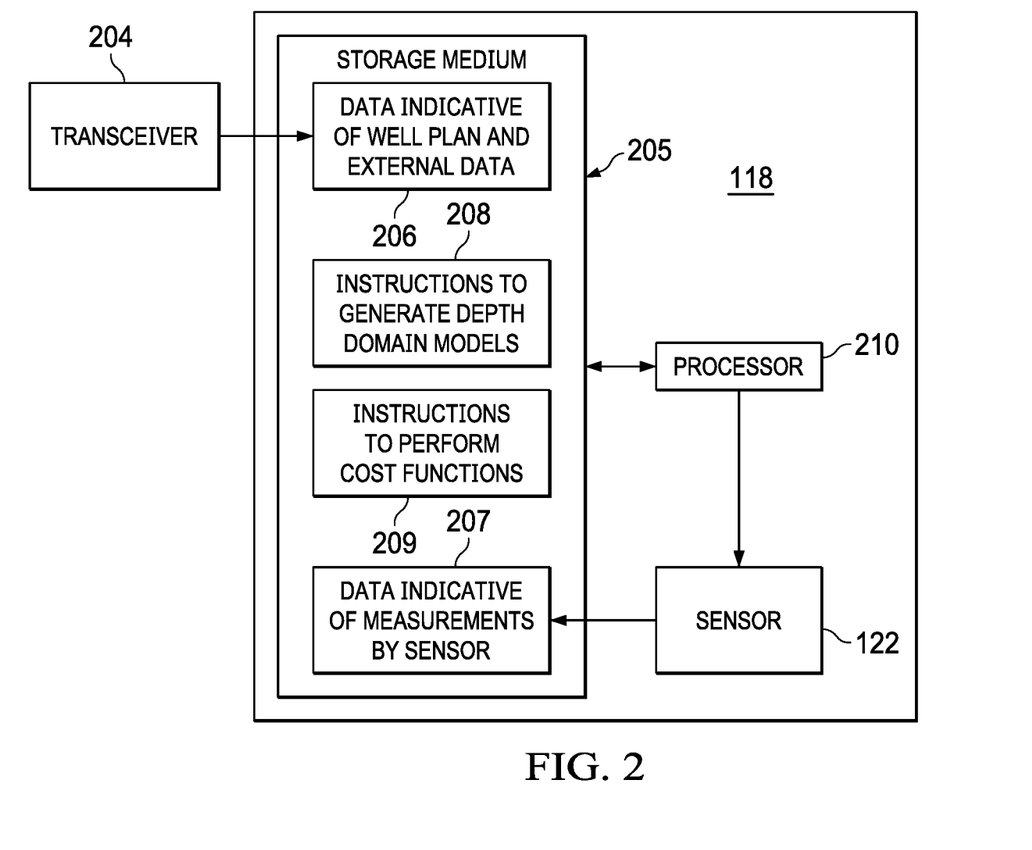
FIG. 2 is a block diagram of the steering system of FIGS. 1A and 1B.

FIG. 2 is a block diagram of the steering system 118 of FIGS. 1A and 1B. The steering system 118 includes the sensor 122, a storage medium 205, and a processor 210. The storage medium 205 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 205 includes multiple data storage devices. In further embodiments, the multiple data storage devices may be physically stored at different locations.

External data is transmitted via transceiver 204 to the steering system 118 is stored at a first location 206 of the storage medium 205. As defined herein, external data includes data indicative of the well plan, earth model, offset wells, measurements made by surface based sensors as well as other sensors that are not components of the steering system 118, variable components of joint cost functions described herein, as well as other data and instructions provided by operators or by other systems and tools. Further, data indicative of measurements made by the sensor 122 are stored in a second location 207 of the storage medium 205. As shown in FIG. 2, instructions to generate depth domain models described herein based on the external data and the measurements made by the sensor 122 are stored at a third location 208 of the storage medium 205, and instructions to perform at least one cost function 209 described herein are stored in a fourth location of the storage medium 205. The instructions to perform other operations described herein are also stored in the storage medium 205.

The processor 210 periodically executes the instructions to generate a trajectory of the borehole. The processor 210 periodically obtains the well path of the well plan from the storage medium 205, and determines whether the trajectory of the borehole 106 deviates from the well path. The processor 210, in response to determining the trajectory of the borehole 106 respective to the well path specified by the well plan, obtains the instructions to perform a cost function as well as the applicable components of the cost function from the storage medium 205, and performs the cost function of the generated trajectory of the borehole 106 to determine which steering action should be performed by the drill bit 120.

The processor 210, upon determining a steering action that minimizes (or maximizes) the cost function, instructs the drill bit 120 to perform the determined steering action (or action sequence). As the drill bit 120 performs the determined steering action or action sequence to drill a new section of the borehole, the sensor 122 performs measurements of the newly drilled section of the borehole 106, the steering system 118 at the newly drilled section, the surrounding formation proximate the newly drilled section of the borehole 106, as well as other measurements described herein. The new measurements are provided to the storage medium 205 and are stored at the second location 207 of the storage medium 205. Further, any newly acquired external data are also stored at the first location of the storage medium 205. The Processor 210 is operable to utilize the new measurements and the newly acquired external data (or previously acquired external data if such data is still up to date) to calibrate a new trajectory of the borehole 106 to compare the new section of the borehole to the well path. The foregoing sequence of operations may be periodically or continuously performed by the processor 210 to correct any deviation from the well path specified by the well plan. In some embodiments, the processor 210 is operable to dynamically perform the foregoing operations. In other embodiments, the processor 210 performs the foregoing operations in response to instructions from an operator.

Although FIG. 2 illustrates the storage medium 205 storing external data and data indicative of measurements by the sensor 122 at different locations, the external data and data indicative of measurements made by the sensor 122 may be stored at the same location or on the same partition. Similarly, data indicative of instructions executed by the processor 210 may also be stored at the same location or in different partitions of the storage medium 205. Further, in some embodiments, the transceiver 204 is a component of the steering system 118. Moreover, in some embodiments, models and cost functions generated by the processor 210 may be transmitted via the transceiver 204 to other downhole or surface based tools or devices. Further, although the foregoing paragraphs describe the sensor 122, the medium 205, and the processor 210 being components of the steering system 118, in some embodiments, the sensor 122, the storage medium 205, and the processor 210 are components of the drilling tool 124. Further, in some embodiments, the steering system 118 is the MPC.

Figure 3A:
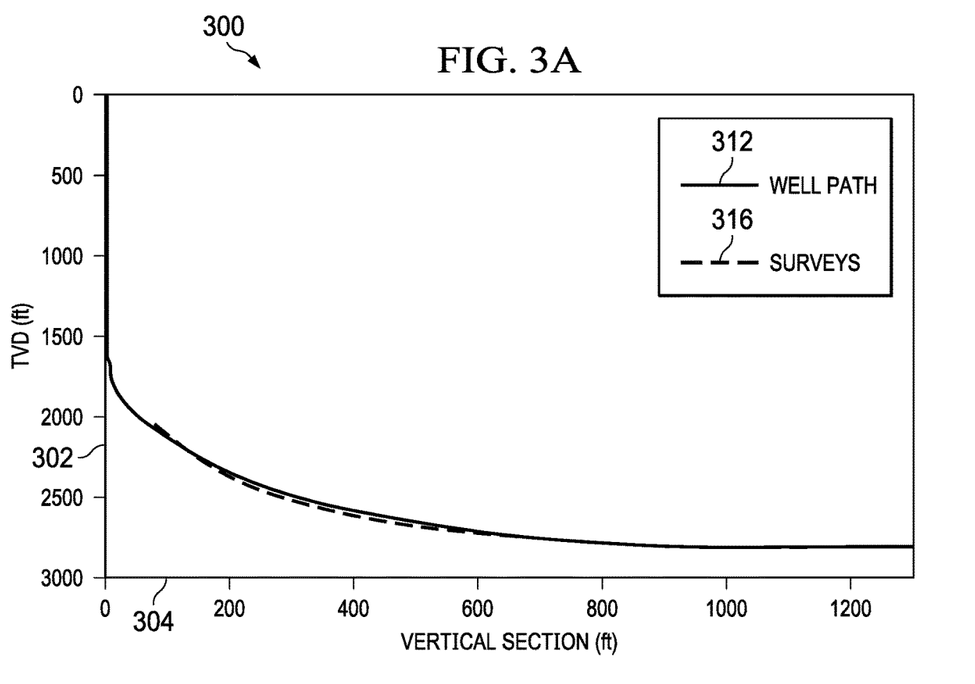
FIG. 3A is a chart comparing a well path of a well plan with a well path of a borehole drilled by the steering system of FIG. 1 over a vertical section.
Figure 3B:
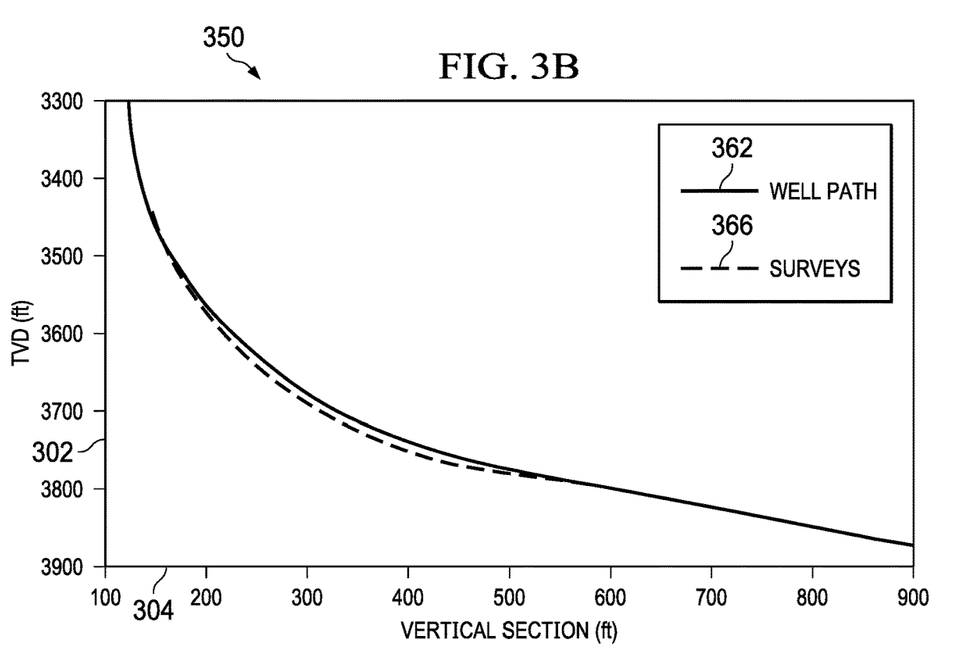
FIG. 3B is another chart comparing a second well path of a second well plan with a well path of a second borehole drilled by the steering system of FIG. 1 over a vertical section.

FIG. 3A is a chart comparing a well path of a well plan with a path of a borehole drilled by the steering system 118 of FIG. 1 over a vertical section. FIG. 3B is another chart comparing a second well path of a second well plan with a path of a second borehole drilled by the steering system 118 of FIG. 1 over a vertical section. Axis 302 represents a true vertical depth of the steering system 118 and axis 304 represents a horizontal distance of the borehole 106 in each of FIGS. 3A and 3B. Further, lines 312 and 362 represent a first well path and a second well path specified by the first and the second well plans, respectively. Lines 316 and 366 represent actual paths of the borehole formed by the steering system. As shown in both FIGS. 3A and 3B, the steering system 118 is operable to steer the drill bit 120 towards the well path to correct the introduced deviations. One of ordinary skill would understand that FIGS. 3A and 3B illustrate two example comparisons, and that the steering system 118 described herein is operable to provide a variety outputs based on different measurements.

Figure 4:
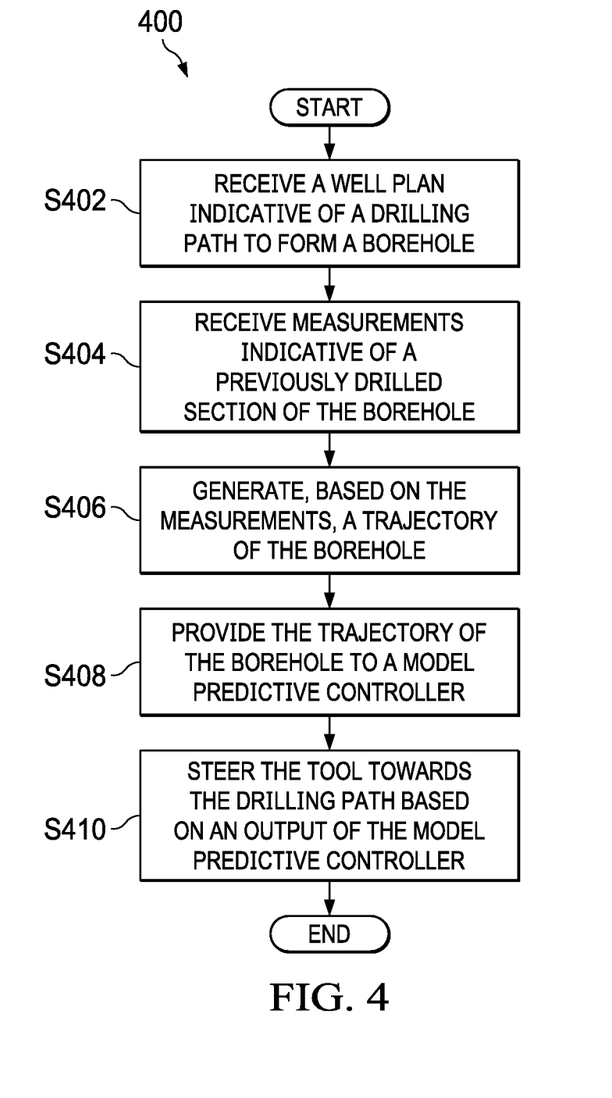
FIG. 4 is a flow chart of a process to improve downhole drilling.

FIG. 4 is a flow chart of a process 400 to improve downhole drilling. Although the operations in the process 400 are shown in a particular sequence, certain operations may be performed in different sequences or at the same time where feasible.

The steering system 118 receives, at block S402, a well plan indicative of a well path to drill the borehole 106. In some embodiments, the steering system 118 also receives other external data and stores such external data in the storage medium 205 component of the steering system 118. At block S404, the steering system 118 receives measurements indicative of a previously-drilled section of the borehole. In some embodiments, the length (collinear), depth, and area of the section of the previously-drilled section are based on the distance between the drill bit 120 and the sensor 122. In other embodiments, where an operator designates a desired frequency for the steering system 108 to determine whether the drilled borehole deviates from the well path specified by the well plan, the length, depth, and area of the section of the previously-drilled section of the borehole varies, based on the frequency at which the steering system 118 performs the foregoing process. In further embodiments, where the steering system 118 determines whether the drilled borehole deviates from the well path after a threshold distance (e.g., 30 feet, 60 feet, 90 feet, or any other quantifiable distance) traveled by the drill bit 120, after a threshold time period, or after a threshold number of steering actions performed by the drill bit 120, measurements of the previously-drilled section is based on the threshold distance, threshold time period, or the threshold number of steering actions, respectively.

At block S406, the steering system 118 generates, based on the measurements, a trajectory of the borehole. In some embodiments, the steering system utilizes a model predictive control having a depth based control scheme to generate the trajectory of the borehole. In one of such embodiments, the model predictive control utilizes the following equations 1-5 to define the cost function (equation 1) and model describing the wellbore propagation (equations 2 through 5).

$$U_t*(x(t)) = \arg\min U_t \sum_{k=0}^{N-1} q(x_{t+k}, u_{t+k}) \quad \text{Equation 1}$$

Subject to $x_t = x(t)$ $$x_{t+k+1} = Ax_{t+k} + a_t u_{t+k} + a_\delta \delta_{t+k}, k = 0, \ldots, N-1 \quad \text{Equation 2}$$

$$A_B \partial_{t+k} - DV x_{t+k} - d \le 0, k = 0, \ldots, N-1 \quad \text{Equation 3}$$

$$\mu_{t+k}^T (A_B \delta_{t+k} - DV x_{t+k} - d) = 0, k = 0, \ldots, N-1 \quad \text{Equation 4}$$

$$\mu_{t+k} \ge 0, k = 0, \ldots, N-1 \quad \text{Equation 5}$$

Where $u(\tau) \in u, x(\tau) \in \chi$ $U_t = \{u_t, u_{t+a}, \ldots, u_{t+N-1}\}$ where t is the current depth. $q(x_{t+k}, u_{t+k})$ is the cost at the $k^{th}$ prediction step, $x_{t+k}$ is the state vector at the $k^{th}$ prediction step, $U_{t+k}$ is the control at the $k^{th}$ prediction step. N is the total number of prediction steps, $H_B$, $A_B$ and $F_B$ are matrices of appropriate dimensions calculated from beam mechanics, $\delta_{t+k}$ is the stabilizer offset vector at the $k^{th}$ prediction step, $\mu_{t+k}$ is the array of lagrangian multipliers indicating whether the stabilizer is in contact with the wellbore. When a component of $\mu_{t+k}$ is zero, then the stabilizer is not in contact with the wellbore. Otherwise, the stabilizer is touching the wellbore. Further, the equation $A_B \partial_{t+k} - DV x_{t+k} - d \le 0$ is essentially the constraint that the stabilizers must stay inside the wellbore. Further, u is the set of admissible controls, and $\chi$ is the set of admissible states. Further, $U_t$ is the collection of control inputs over the prediction horizon. Further, r is each of the following: t, t+1, . . . , t+N−1.

In some embodiments, the depth based models described herein are generated based on a coupling between a bottom hole assembly model, a bit/rock-interaction model, and a kinematic model. In such embodiments, the steering system 118 uses a bottom hole assembly model to compute at least one of the deflection, slope, bending moment, and shear along the bottom hole assembly (the drilling tool 124, or a component of the drilling tool 124) to determine efforts at the drill bit 120 and the reaction force at the stabilizers of the drilling tool 124. Further, the interaction between the bottom hole assembly (or the drilling tool 124), which is a mechanical object, and the borehole, which is a geometrical object, creates depth-based delays. These depth-based delays refer to the positions of the stabilizers behind the drill bit 120, but in general are also extended to any possible contact between the bottom hole assembly (or the drilling tool 124) and the borehole. In some embodiments, these depth-based delays signify that the local directional tendency of the system is history-dependent as the borehole geometry over a distance (such as over 50 feet) significantly influences the response of the steering system 118.

In some embodiments, the bit/rock interaction model describes the bit motion of the drill bit 120 into the surrounding formation 112 for a given set of generalized forces applied on the drill bit 120. In such embodiments, the bit/rock interaction model represents the lower boundary condition of the bottom hole assembly model. Examples of parameters of the bit/rock model include measures of the steerability of the drill bit 120, the walk tendency of the drill bit 120, the wear on the drill bit 120, and the side-cutting efficiency of the drill bit 120. In some embodiments, outputs of the bottom hole assembly model, the bit/rock-interaction model, and the kinematic model are utilized to simulate borehole propagation and optimize the steering commands through a model predictive controller.

In some embodiments, the steering system 118 periodically uses a second and more accurate depth domain model that considers additional metrics such as over gauge, under gauge, weight on bit. In some embodiments, the steering system 118 periodically generates both the depth domain model and the second, more accurate depth domain model to obtain two models of the projected trajectory of the borehole. In one of such embodiments, the depth domain model is utilized by the steering system to determine optimal controls and configurations of the drilling tool 124 and to steer the drilling tool 124 towards the well path, whereas the second more accurate depth domain model is utilized by the steering system to forecast a section of the borehole that has been created but has not been measured.

At block S408, the steering system 118 feeds the trajectory of the borehole into a MPC controller, which utilizes the trajectory of the borehole to obtain outputs indicative of steering actions to steer the drilling tool 124 towards the well path. In some embodiments, the steering system 118 performs a cost function having one or more variable components to determine a steering action that minimizes the cost function. At block S410, the steering system 118 steers the drilling tool 124 to steer towards the well path based on the outputs of the MPC controller. The process 400 then ends. In some embodiments, the steering system 118 determines a distance travelled by the drilling tool 124 since the most trajectory of the borehole 106 was last generated. In other embodiments, the steering system 118 determines a period of time that has elapsed since the most trajectory of the borehole 106 was last generated. In the foregoing embodiments, the steering system 118 performs the foregoing operations to generate anew trajectory of the borehole after the drilling tool 124 has traveled a threshold distance or after a threshold period of time has elapsed, respectively.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to improve downhole drilling, the method comprising receiving a well plan, the well plan being indicative of a well path to form a borehole of a hydrocarbon well; receiving measurements indicative of a previously-drilled section of the borehole; generating, based on the measurements, a trajectory of the borehole, wherein the trajectory is a function of a depth; providing the trajectory of the borehole to a Model Predictive Controller; and steering a tool to steer towards the well path based on an output of the Model Predictive Controller.

Clause 2, the method of clause 1, further comprising calculating a cost function in the model predictive controller, the cost function having a first component being a deviation between the trajectory of the borehole and drill path, and determining a steering action that minimizes the cost function, wherein steering the tool towards the well path comprises instructing the tool to perform the steering action obtained from a minimization of the cost function.

Clause 3, the method of clause 1 or 2, wherein the cost function comprises at least one additional component, the at least one additional component comprising at least one of a tortuosity of the trajectory of the borehole, a rate of penetration, a threshold smoothness of the trajectory of the borehole, and a rate of change in a curvature of the trajectory of the borehole, and wherein determining the steering action comprises determining a steering action that minimizes the cost function.

Clause 4, the method of any of clauses 1-3, further comprising calculating a cost function in the model predictive controller, the cost function having a first component being a deviation between the trajectory of the borehole and drill path, and determining a steering action that minimizes the cost function, wherein instructing the tool to steer towards the well path comprises recommending the tool to perform the steering action obtained from a minimization of the cost function.

Clause 5, the method of any of clauses 1-4, further comprising determining at least one measurement indicative of an interaction between the tool and a formation surrounding the borehole, wherein the at least one measurement indicative of the at least one interaction between the tool and the formation surrounding the borehole comprises at least one of a value of a weight on bit, a side cutting efficiency of the bit, a geometry of the tool, and a property of a formation surrounding the borehole, and wherein generating the trajectory of the borehole comprises generating the trajectory of the borehole based on at least one of the measurements indicative of the at least one interaction between the tool and the formation surrounding the borehole.

Clause 6, the method of any of clauses 1-5, further comprising generating, based on a model of borehole propagation, the trajectory of the borehole, wherein generating the trajectory of the borehole is based on at least one of a bottom hole assembly model and a bit/rock interaction model.

Clause 7, the method of any of clauses 1-6, further comprising determining at least one interaction between the bottom hole assembly model and the bit/rock interaction model, wherein generating the trajectory of the borehole comprises generating the trajectory of the borehole based on the at least one interaction between the bottom hole assembly model and the bit/rock interaction model.

Clause 8, the method of any of clauses 1-7, further comprising determining a distance traveled by the tool since a most recent trajectory of the borehole was generated; and regenerating the trajectory of the borehole after the tool has traveled a threshold distance.

Clause 9, the method of any of clauses 1-8, further comprising determining a period of time that has elapsed since a most recent trajectory of the borehole was generated; and regenerating the trajectory of the borehole after the tool has traveled a threshold period of time.

Clause 10, the method of any of clauses 1-9, further comprising predicting, based on the measurements and steering recommendations, an undrilled section of the borehole.

Clause 11, the method of any of clauses 1-10, further comprising determining if the trajectory of the borehole deviates from the well path by more than a threshold measurement, wherein instructing the tool to steer towards the well path comprises instructing the tool to steer the tool towards the well path based on the output of the Model Predictive Controller in response to a determination that the trajectory of the borehole deviates from the well path by more than the threshold measurement.

Clause 12, a steering system, comprising a sensor operable to obtain measurements indicative of a previously-drilled section of a borehole of a hydrocarbon well; and a processor operable to obtain a well plan, the well plan being indicative of a well path to form the borehole; receive measurements indicative of a previously-drilled section of the borehole; and generate, based on the measurements, a trajectory of the borehole, wherein the trajectory is a function of a depth of a drilling tool operating to form the borehole.

Clause 13, the steering system of clause 12, wherein the processor is further operable to calculate a cost function of the trajectory of the borehole, the cost function having a first component being a deviation between the trajectory of the borehole and drill path; and determine a steering action that minimizes the first component, wherein the processor controls a drill bit of the drilling tool to perform the steering action obtained from a minimization of the cost function.

Clause 14, the steering system of clause 12 or 13, wherein the cost function comprises at least one additional component, the at least one additional component comprising at least one of a tortuosity of the trajectory of the borehole, a threshold smoothness of the trajectory of the borehole, and a rate of change in a curvature of the trajectory of the borehole.

Clause 15, the steering system of any of clauses 12-14, wherein the processor is further operable to calculate a cost function of the trajectory of the borehole, the cost function having a first component being a deviation between the trajectory of the borehole and drill path; and determine a steering action that minimizes the first component, wherein the processor is further operable to recommend a steering action obtained from a minimization of the cost function.

Clause 16, the steering system of any of clauses 12-15, wherein the processor is further operable to determine at least one measurement indicative of an interaction between the drill bit and a formation surrounding the borehole, wherein the at least one measurement indicative of the at least one interaction between the tool and the formation surrounding the borehole comprises at least one of a value of a weight on bit, torque on bit, rotary speed, rate of penetration, a side cutting efficiency of the bit, a geometry of the tool, and a property of a formation surrounding the borehole, wherein the trajectory of the borehole is based on at least one of the measurements indicative of the at least one interaction between the tool and the formation surrounding the borehole.

Clause 17, the steering system of any of clauses 12-16, wherein the processor is further operable to generate, based on a model of borehole propagation, the trajectory of the borehole, wherein the trajectory of the borehole is based on at least one of a bottom hole assembly model and a bit/rock interaction model.

Clause 18, the steering system of any of clauses 12-17, wherein the processor is further operable to determine if the trajectory of the borehole deviates from the well path by more than a threshold measurement, wherein trajectory of the borehole is generated in response to a determination that the trajectory of the borehole deviates from the well path by more than the threshold measurement.

Clause 19, the steering system, of any of clauses 12-18, wherein the processor is further operable to predict, based on the measurements and steering recommendations, an undrilled section of the borehole.

Clause 20, a machine-readable medium comprising instructions stored therein, which when executed by one or more processors, causes the one or more processors to perform operations comprising receiving a well plan, the well plan being indicative of a well path to form a borehole of a hydrocarbon well; receiving measurements indicative of a previously-drilled section of the borehole; generating, based on the measurements, a trajectory of the borehole, wherein the trajectory is a function of a depth of a tool operating to form the borehole; calculating a cost function, the cost function having a first component being a deviation between the trajectory of the borehole and drill path; determining a steering action that minimizes the cost function; and recommending the steering action obtained from a minimization of the cost function.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to improve downhole drilling, the method comprising:
   receiving a well plan, the well plan being indicative of a well path to form a borehole of a hydrocarbon well;

receiving measurements indicative of a previously-drilled section of the borehole;
generating, based on the measurements, a depth domain model of a trajectory of the borehole, wherein the trajectory is a function of a depth;
providing the trajectory of the borehole to a Model Predictive Controller;
utilizing the Model Predictive Controller to produce control inputs for steering a tool based on the depth domain model; and
steering a tool towards the well path based on the control inputs.

2. The method of claim 1, further comprising:
calculating a cost function in the model predictive controller, the cost function having a first component being a deviation between the trajectory of the borehole and drill path, and
determining a steering action that minimizes the cost function,
wherein steering the tool towards the well path comprises instructing the tool to perform the steering action obtained from a minimization of the cost function.

3. The method of claim 2, wherein the cost function comprises at least one additional component, the at least one additional component comprising at least one of a tortuosity of the trajectory of the borehole, a rate of penetration, a threshold smoothness of the trajectory of the borehole, and a rate of change in a curvature of the trajectory of the borehole, and wherein determining the steering action comprises determining a steering action that minimizes the cost function.

4. The method of claim 1, further comprising:
calculating a cost function in the model predictive controller, the cost function having a first component being a deviation between the trajectory of the borehole and drill path, and
determining a steering action that minimizes the cost function,
wherein instructing the tool to steer towards the well path comprises recommending the tool to perform the steering action obtained from a minimization of the cost function.

5. The method of claim 1,
further comprising determining at least one measurement indicative of an interaction between the tool and a formation surrounding the borehole,
wherein the at least one measurement indicative of the at least one interaction between the tool and the formation surrounding the borehole comprises at least one of a value of a weight on bit, a side cutting efficiency of the bit, a geometry of the tool, and a property of a formation surrounding the borehole, and
wherein generating the trajectory of the borehole comprises generating the trajectory of the borehole based on at least one of the measurements indicative of the at least one interaction between the tool and the formation surrounding the borehole.

6. The method of claim 1,
further comprising generating, based on a model of borehole propagation, the trajectory of the borehole,
wherein generating the trajectory of the borehole is based on at least one of a bottom hole assembly model and a bit/rock interaction model.

7. The method of claim 6,
further comprising determining at least one interaction between the bottom hole assembly model and the bit/rock interaction model,
wherein generating the trajectory of the borehole comprises generating the trajectory of the borehole based on the at least one interaction between the bottom hole assembly model and the bit/rock interaction model.

8. The method of claim 1, further comprising:
determining a distance traveled by the tool since a most recent trajectory of the borehole was generated; and
regenerating the trajectory of the borehole after the tool has traveled a threshold distance.

9. The method of claim 1, further comprising:
determining a period of time that has elapsed since a most recent trajectory of the borehole was generated; and
regenerating the trajectory of the borehole after the tool has traveled a threshold period of time.

10. The method of claim 1, further comprising predicting, based on the measurements and steering recommendations, an undrilled section of the borehole.

11. The method of claim 1,
further comprising determining if the trajectory of the borehole deviates from the well path by more than a threshold measurement,
wherein instructing the tool to steer towards the well path comprises instructing the tool to steer the tool towards the well path based on the output of the Model Predictive Controller in response to a determination that the trajectory of the borehole deviates from the well path by more than the threshold measurement.

12. A steering system, comprising:
a sensor operable to obtain measurements indicative of a previously-drilled section of a borehole of a hydrocarbon well; and
a processor operable to:
obtain a well plan, the well plan being indicative of a well path to form the borehole;
receive measurements indicative of a previously-drilled section of the borehole;
generate, based on the measurements, a depth domain model of a trajectory of the borehole, wherein the trajectory is a function of a depth of a drilling tool operating to form the borehole;
utilize a Model Predictive Controller to produce control inputs for steering the drilling tool based on the depth domain model; and
request steering of the drilling tool towards the well path based on the control inputs.

13. The steering system of claim 12, wherein the processor is further operable to:
calculate a cost function of the trajectory of the borehole, the cost function having a first component being a deviation between the trajectory of the borehole and drill path; and
determine a steering action that minimizes the first component,
wherein the processor controls a drill bit of the drilling tool to perform the steering action obtained from a minimization of the cost function.

14. The steering system of claim 13, wherein the cost function comprises at least one additional component, the at least one additional component comprising at least one of a tortuosity of the trajectory of the borehole, a threshold smoothness of the trajectory of the borehole, and a rate of change in a curvature of the trajectory of the borehole.

15. The steering system of claim 12, wherein the processor is further operable to:

calculate a cost function of the trajectory of the borehole, the cost function having a first component being a deviation between the trajectory of the borehole and drill path; and determine a steering action that minimizes the first component, wherein the processor is further operable to recommend a steering action obtained from a minimization of the cost function.

16. The steering system of claim 12, wherein the processor is further operable to:

determine at least one measurement indicative of an interaction between the drill bit and a formation surrounding the borehole, wherein the at least one measurement indicative of the at least one interaction between the tool and the formation surrounding the borehole comprises at least one of a value of a weight on bit, torque on bit, rotary speed, rate of penetration, a side cutting efficiency of the bit, a geometry of the tool, and a property of a formation surrounding the borehole, wherein the trajectory of the borehole is based on at least one of the measurements indicative of the at least one interaction between the tool and the formation surrounding the borehole.

17. The steering system of claim 12, wherein the processor is further operable to:

generate, based on a model of borehole propagation, the trajectory of the borehole, wherein the trajectory of the borehole is based on at least one of a bottom hole assembly model and a bit/rock interaction model.

18. The steering system of claim 12, wherein the processor is further operable to:

determine if the trajectory of the borehole deviates from the well path by more than a threshold measurement, wherein trajectory of the borehole is generated in response to a determination that the trajectory of the borehole deviates from the well path by more than the threshold measurement.

19. The steering system, of claim 12, wherein the processor is further operable to predict, based on the measurements and steering recommendations, an undrilled section of the borehole.

20. A machine-readable medium comprising instructions stored therein, which when executed by one or more processors, causes the one or more processors to perform operations comprising:

receiving a well plan, the well plan being indicative of a well path to form a borehole of a hydrocarbon well;

receiving measurements indicative of a previously-drilled section of the borehole;

generating, based on the measurements, depth domain model of a trajectory of the borehole, wherein the trajectory is a function of a depth of a tool operating to form the borehole;

calculating a cost function of the depth domain model, the cost function having a first component being a deviation between the trajectory of the borehole and drill path;

determining a steering action that minimizes the cost function; and recommending the steering action obtained from a minimization of the cost function.

* * * * *